(12) United States Patent
Collingbourne (10) Patent No.: US 9,475,572 B2
(45) Date of Patent: Oct. 25, 2016

(54) PROPELLER OPERATION (75) Inventor: Peter Wayne Collingbourne, Bristol (GB)

(73) Assignee: BAE Systems plc, London (GB)

( * ) Notice: Subject to any disclaimer, the term of this patent is extended or adjusted under 35 U.S.C. 154(b) by 474 days.

(21) Appl. No.: 14/008,753

(22) PCT Filed: Mar. 29, 2012

(86) PCT No.: PCT/GB2012/050703
§ 371 (c)(1),
(2), (4) Date: Sep. 30, 2013

(87) PCT Pub. No.: WO2012/131373
PCT Pub. Date: Oct. 4, 2012

(65) Prior Publication Data
US 2014/0023499 A1 Jan. 23, 2014

(30) Foreign Application Priority Data
Mar. 31, 2011 (EP) .................................... 11275059
Mar. 31, 2011 (GB) .................................... 1105451.7

(51) Int. Cl.
*B64C 19/00* (2006.01)
*B64C 11/30* (2006.01)

(52) U.S. Cl.
CPC ............. *B64C 19/00* (2013.01); *B64C 11/305* (2013.01); *Y02T 50/66* (2013.01)

(58) Field of Classification Search
CPC ...... B64C 11/305; B64C 19/00; Y02T 50/66
See application file for complete search history.

(56) References Cited

U.S. PATENT DOCUMENTS 5,209,640 A    5/1993 Moriya
5,416,699 A *  5/1995 DiValentin ............ B64C 11/305
                                                    701/3

(Continued)

FOREIGN PATENT DOCUMENTS

EP    0 436 231 A2    7/1991
JP    4-015196 A      1/1992
WO   WO 99/51868 A1  10/1999

OTHER PUBLICATIONS

Notification Concerning Transmittal of International Preliminary Report on Patentability (Chapter I of the Patent Cooperation Treaty) (Forms PCT/IB/326 and PCT/IB/373) and the Written Opinion of the International Searching Authority (Form PCT/ISA/237) issued on Oct. 10, 2013, by the International Bureau of WIPO in corresponding International Application No. PCT/GB2012/050703. (6 pages).

(Continued)

*Primary Examiner* — Igor Kershteyn
(74) *Attorney, Agent, or Firm* — Maine Cernota & Rardin (57) ABSTRACT

A method of and apparatus for operating a propeller, the propeller moving through a fluid, the method including: measuring a value of a property of the fluid (e.g. a parameter related to the density of the fluid); measuring a value of a parameter, the parameter related to one or more forces applied to the propeller (e.g. a torque applied to the propeller) or derived at least in part from the action of the propeller (e.g. a thrust produced by the action of the propeller, a drag produced by the action of the propeller, or a velocity produced by the action of the propeller); and controlling the propeller depending on a function of the measured value of the property of the fluid and the measured value of parameter. The propeller may be a propeller on an aircraft.

16 Claims, 4 Drawing Sheets

(56) References Cited

U.S. PATENT DOCUMENTS

| | | | |
|---|---|---|---|
| 5,795,132 A * | 8/1998 | Wheeler | B64C 11/44 416/147 |
| 5,997,250 A * | 12/1999 | Carter, Jr. | B64C 11/40 416/1 |
| 6,171,055 B1 * | 1/2001 | Vos | F02C 9/44 416/1 |
| 6,468,035 B1 | 10/2002 | Otake et al. | |
| 6,808,141 B2 * | 10/2004 | Bretscher | B64D 31/06 244/76 R |
| 7,720,578 B2 * | 5/2010 | Delannoy | G05D 1/0825 701/4 |

OTHER PUBLICATIONS

International Search Report (PCT/ISA/210) mailed on Jul. 3, 2012, by the British Patent Office as the International Searching Authority for International Application No. PCT/GB2012/050703.

Search Report mailed on Jul. 18, 2011, by the British Patent Office for Application No. 1105451.7.

Search Report mailed on Sep. 1, 2011, by the European Patent Office for Application No. 11275059.1.

* cited by examiner

PROPELLER OPERATION

FIELD OF THE INVENTION

The present invention relates to operating a propeller.

BACKGROUND

Turboprop engines are a type of aircraft power plant that use a gas turbine to drive a propeller.

Modern turboprop propulsion systems generally operate constant speed propellers. The pitches of the blades of the propellers are varied to absorb the supplied shaft power.

In typical turboprop installations, the pilot is supplied with a limited range within which he is permitted to vary propeller speed (by varying the pitches of the propeller blades) in order to increase turboprop efficiency. This increase in efficiency tends to reduce fuel burn and emissions. An amount to vary the propeller speed tends to be deduced manually, e.g. from charts supplied by the aircraft manufacturer.

It tends to only be practical to adjust propeller speed manually in a periodic fashion, and periodically on long steady flight segments. This is to avoid excessive pilot workload.

Furthermore, other than that provided by the pilot, there is typically no integration of the propeller, powerplant and airframe. Thus, in unmanned aircraft there is typically no method of increasing turboprop efficiency by varying propeller speed.

SUMMARY OF THE INVENTION

In a first aspect, the present invention provides a method of operating a propeller, the propeller moving through a fluid, the method comprising: measuring a value of a property of the fluid; measuring a value of a parameter, the parameter related to one or more forces applied to the propeller or derived at least in part from the action of the propeller; and controlling the propeller depending on a function of the measured value of the property of the fluid and the measured value of parameter.

The property of the fluid may be related to a density of the fluid.

The step of measuring a value for the parameter may comprise measuring a value for thrust produced, at least in part, by the action of the propeller.

The step of measuring a value for the parameter may comprise measuring a value of a parameter related to drag produced, at least in part, by the action of the propeller.

The step of measuring a value for the parameter may comprise measuring a value for a torque applied to the propeller, and measuring a value for a velocity produced, at least in part, by the action of the propeller.

The function may be a function for determining a rotational speed for the propeller.

The function may be:

$$n^2 = \frac{T}{3a_0 \rho D^4}$$

where:
n is the rotational speed for the propeller;
T the is the measured thrust produced by the action of the propeller;
$\rho$ is a density of the fluid;
D is a diameter of the propeller; and
$a_0$ is a constant.

The function may be:

$$n^2 = \frac{F_D}{3a_0 \rho \eta_i N D^4}$$

where:
n is the rotational speed for the propeller;
$F_D$ is a drag force;
$\eta_i$ is an installation efficiency factor;
N is a total number of propellers;
$\rho$ is a density of the fluid;
D is a diameter of the propeller; and
$a_0$ is a constant.

The function may be:

$$n = \frac{-\left(\frac{b_1 V}{D}\right) + \sqrt{\left(\frac{b_1 V}{D}\right)^2 - 4b_0\left(\frac{b_2 V^2}{D^2} - \frac{2\pi Q}{\rho D^5}\right)}}{2b_0}$$

where:
n is the rotational speed for the propeller;
V is the measured value for the velocity produced by the action of the propeller;
Q is the measured value for the torque applied to the propeller;
$\rho$ is property density of the fluid;
D is a diameter of the propeller;
$b_0$ is a constant;
$b_1$ is a constant; and
$b_2$ is a constant.

A constant may be determined by approximating an optimum propeller efficiency using a polynomial, the constant being a coefficient of a term of the polynomial.

The step of controlling the propeller may comprise varying a rotational speed of the propeller.

The propeller may be a propeller of an unmanned aircraft. The propeller may be driven by a gas turbine engine. The propeller may be a turboprop, in particular it may be a free turbine, turboprop.

In a further aspect, the present invention provides apparatus for operating a propeller, the propeller moving through a fluid, the apparatus comprising: one or more sensors arranged to: measure a value of a property of the fluid; and measure a value of a parameter, the parameter related to one or more force applied to the propeller or derived at least in part from the action of the propeller; and means for controlling the propeller, wherein the propeller is controlled depending on a function of the measured value of the property of the fluid and the measured value of parameter.

In a further aspect, the present invention provides a program or plurality of programs arranged such that when executed by a computer system or one or more processors it/they cause the computer system or the one or more processors to operate in accordance with any of the above aspects.

In a further aspect, the present invention provides a machine readable storage medium storing a program or at least one of the plurality of programs according to the above aspect.

DETAILED DESCRIPTION

Figure 1:
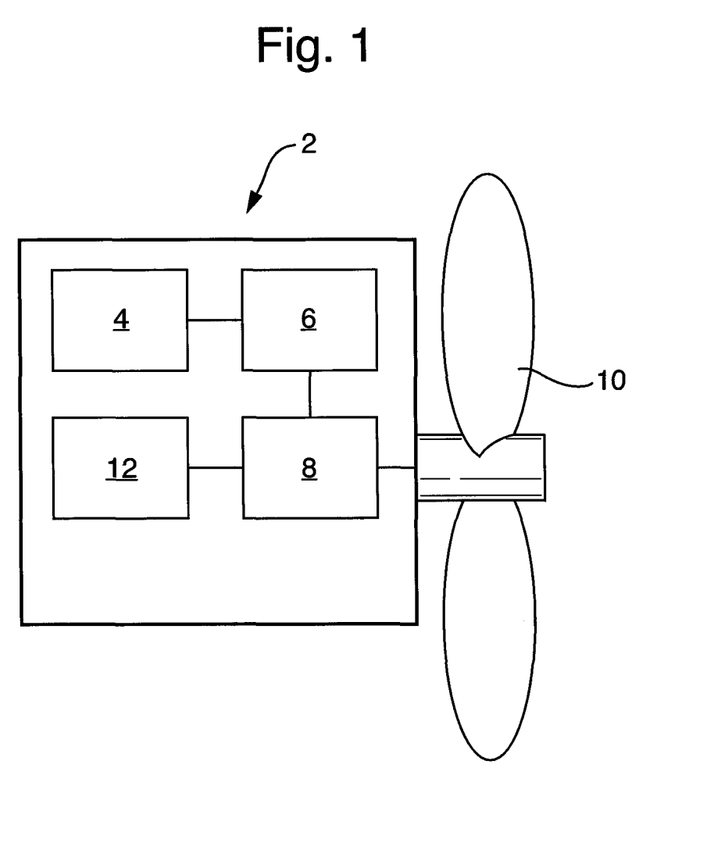
FIG. 1 is a schematic illustration (not to scale) of an example of an aircraft that will be used to implement a process of determining a propeller speed.

FIG. 1 is a schematic illustration (not to scale) of an example of an aircraft 2 that will be used to implement embodiments of a process of determining a propeller speed.

In this example, the aircraft 2 is an unmanned aircraft. In this example, the aircraft 2 is moving through the air.

In this example, the aircraft 2 comprises a plurality of sensors 4 (which is represented by a single box in FIG. 1), a processor 6, a propeller governor 8, a propeller 10, and an engine 12.

In this embodiment, the plurality of sensors 4 comprises one or more sensors that allow for the density of the air that the aircraft 2 is moving through (i.e. the atmospheric air density) to be determined. For example, the plurality of sensors 4 comprises an air temperature sensor and an air pressure sensor, measurements by which allow for an air density to be determined.

Also, the plurality of sensors 4 comprises one or more sensors for measuring the thrust generated by the propeller 10. Also, the plurality of sensors 4 comprises one or more sensors for measuring an airspeed of the aircraft 2 through the air. Also, the plurality of sensors 4 comprises one or more sensors for measuring the torque applied to the propeller 10, i.e. the torque produced by the engine 12 to drive the propeller 10.

Thus in this embodiment, each sensor in the plurality of sensors 4 is for measuring a value of a parameter.

The sensors in the plurality of sensors 4 that are for measuring the thrust generated by the propeller 10, the airspeed of the aircraft 2 through the air, and/or the torque applied to the propeller 10 are sensors that are for measuring a parameter that is either related to one or more forces applied to the propeller 10, or derived at least in part from the action of the propeller 10.

For example, the thrust produced for the aircraft 2 by the action of the propeller is a parameter that is derived, at least in part, from the action of the propeller 10. In this case, the thrust is directly produced from the action of the propeller 10.

Likewise, the airspeed of the aircraft 2 through the air (i.e. an axial speed of the propeller 10) is a parameter that is derived, at least in part from the action of the propeller 10. The propeller produces a thrust on the aircraft 2 which drives the aircraft 2 through the air, thereby imparting an airspeed to the aircraft 2. In this case, the airspeed is indirectly produced by the action of the propeller 10, i.e. it is a result of the thrust produced by the propeller 10. Nevertheless, in this embodiment the airspeed of the aircraft 2 exists because of the action of the propeller 10.

Similarly, a drag force on the aircraft 2 is a parameter that is derived, at least in part, from the action of the propeller 10. The propeller 10 produces a thrust for the aircraft 2 which moves the aircraft 2 through the air. This movement of the aircraft 2 through the air produces a drag force on the aircraft 2. In this case, the drag on the aircraft 2 is indirectly produced by the action of the propeller 10, i.e. it is a result of the aircraft 2 being moved through the air, which is a result of the thrust produced by the propeller 10. Nevertheless, the drag force on the aircraft 2 is due, at least in part, to the action of the propeller 10.

Also, the torque applied to the propeller 10 (i.e. by the engine 12) is a force applied to the propeller 10, i.e. the engine torque is a parameter related to a force applied to the propeller 10. In this case, the torque is a force directly acting on or directly applied to the propeller 10.

In this embodiment, the torque applied to the propeller 10 is a robustly monitored parameter of the gearbox (not shown in the Figures) of the aircraft 2.

In this embodiment, the plurality of sensors 4 is connected to the processor 6.

In this embodiment, the processor 6 is also connected to the propeller governor 8.

In this embodiment, the propeller 10 is connected to the aircraft engine 12 via the propeller governor 8.

In this embodiment, the propeller 10 is a conventional variable pitch propeller. The propeller 10 has two aerofoil blades. Also, the pitch of the blades of the propeller 10 is controlled by the propeller governor 8.

In this embodiment, the propeller 10 is connected to the engine 12. In operation, the engine 12 drives the propeller 10, i.e. causes the propeller 10 to rotate thereby moving the aircraft 2. In this embodiment, the engine 12 driving the propeller (e.g. a free turbine turboprop) is a gas turbine engine. The engine speed is substantially decoupled from the propeller speed such that each respective device is able to be adjusted independently to achieve optimum performance. In particular, the propeller speed can be optimised independently from the engine settings. In an alternative embodiment, a continuously variable transmission (CVT) could be used in combination with any power plant to effect a substantial decoupling between the engine speed and the propeller speed.

Apparatus, including the processor 6, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

Figure 2:
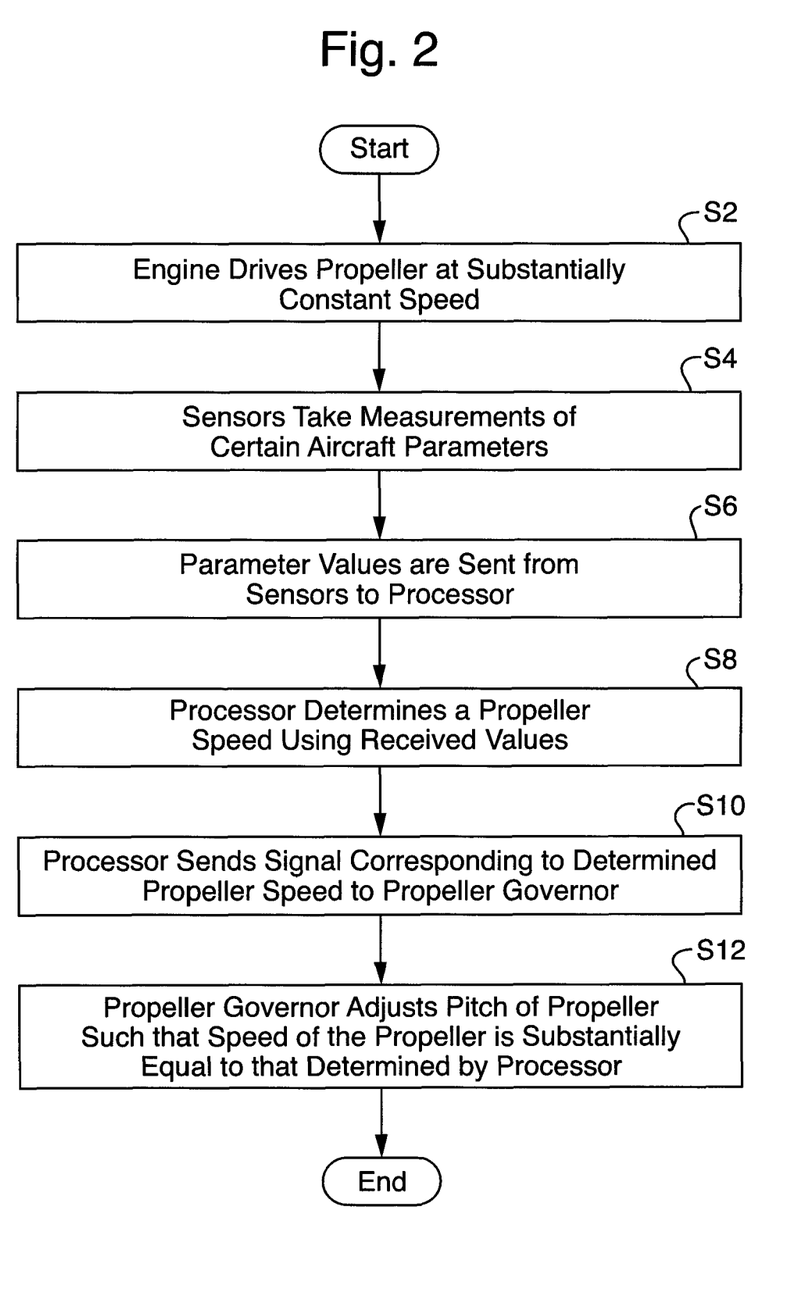
FIG. 2 is a process flowchart showing certain steps of a process of operating the aircraft in which a process of determining a propeller speed is implemented.

FIG. 2 is a process flowchart showing certain steps of an embodiment of a process of operating the aircraft 2. This process comprises a process of determining a propeller speed for the propeller 10.

At step s2, the engine 12 drives the propeller 10 (i.e. causes the propeller 10 to rotate) at a substantially constant speed. Thus, in this embodiment, the aircraft 2 is "cruising".

At step s4, the plurality of sensors 4 measure (or in some other way determine or calculate) values for at least each of the following parameters: the density of the air, and the thrust generated by the propeller 10.

At step s6, the values of the parameters measured by the plurality of sensors 4 at step s4 are sent from the plurality of sensors 4 to the processor 6.

At step s8, using the received parameter values, the processor 6 determines a relatively efficient propeller speed for the propeller 10.

The following information is useful in the understanding of the process performed by the processor 6 in this embodiment at step s8. Steps s10 and s12 of FIG. 2 will be described in more detail later below.

A propeller map, i.e. a graph or chart indicating some performance characteristic of a propeller, can typically be generated for a propeller (e.g. from data supplied by a propeller supplier or manufacturer).

In this embodiment, a propeller map is in non-dimensional coefficient form.

In general, a propeller map may relate two or more of the following non-dimensional coefficients of a propeller:

1) Thrust coefficient $C_T$. In this embodiment, the thrust coefficient of the propeller 10 is expressed as:

$$C_T = \frac{T}{\rho n^2 D^4} = \frac{C_P \eta_P}{J}$$

where:
T the is measured thrust generated by the propeller 10
$\rho$ is the atmospheric density of the air that the aircraft 2 is moving through;
n is the rotational speed (Hz) of the propeller 10;
D is the diameter of the propeller 10;
$C_P$ is the power coefficient of the propeller 10 (see below);
$\eta_P$ is the propulsive efficiency of the propeller 10 (see below); and
J is the advance ratio of the propeller 10 (see below)

2) Power coefficient $C_P$. In this embodiment, the power coefficient of the propeller 10 is expressed as:

$$C_P = \frac{P}{\rho n^3 D^5} = \frac{C_T J}{\eta_P}$$

where: P the is power supplied to the propeller 10 by the engine 12.

3) Torque coefficient $C_Q$. In this embodiment, the torque coefficient of the propeller 10 is expressed as:

$$C_Q = \frac{Q}{\rho n^2 D^5}$$

where: Q the is torque applied to the propeller 10.

4) Advance ratio J. In this embodiment, the advance ratio of the propeller 10 is expressed as:

$$J = \frac{V}{nD} = \frac{C_P}{C_T} \eta_P$$

where: V the is true airspeed of the aircraft 2 (i.e. the axial speed of the propeller 2 through the air).

5) Propulsive efficiency (factor) $\eta_P$. In this embodiment, the propulsive efficiency of the propeller 10 is expressed as:

$$\eta_P = \frac{C_T}{C_P} J$$

Figure 3:
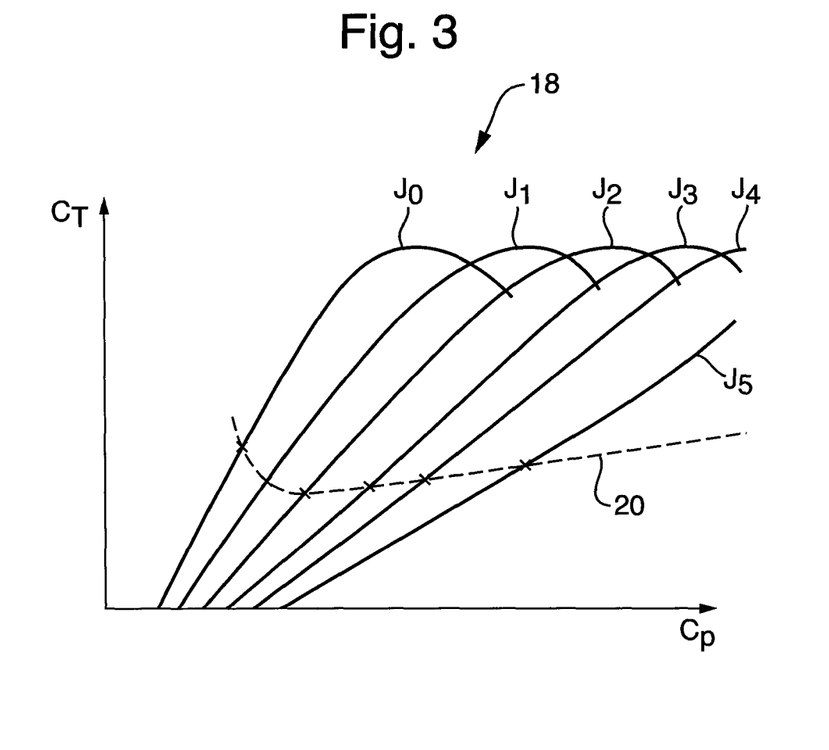
FIG. 3 is a schematic illustration (not to scale) of a propeller map for the propeller of the aircraft that relates the power coefficient $C_P$ and the thrust coefficient $C_T$ of the propeller.

In this embodiment, the processor comprises (or has access to) a propeller map that relates the power coefficient $C_P$ and the thrust coefficient $C_T$ of the propeller 10.

FIG. 3 is a schematic illustration (not to scale) of a propeller map 18 for the propeller 10 that relates the power coefficient $C_P$ and the thrust coefficient $C_T$. In this embodiment, the propeller map 18 is loaded into the processor 6.

A number of advance ratios $J_0$ to $J_5$ for the propeller 10 are indicated on the propeller map 18. Furthermore, a dotted line indicating an optimum efficiency of the propeller 10 (hereinafter referred to as the "optimum efficiency line" and indicated in FIG. 3 by the reference numeral 20) is shown in FIG. 3.

In this embodiment, the optimum efficiency line 20 is approximately linear for typical in-flight advance ratios (e.g. $J_2, J_3, J_4, J_5 \ldots$) and thrust coefficients. Thus, in this embodiment the optimum efficiency line 20 is approximated using a first order polynomial, i.e.

$$C_T = a_1 C_P + a_0$$

or $$C_P = \frac{C_T - a_0}{a_1}$$

where $a_1$ and $a_0$ are constants. Values of these constants are computed from the propeller map 18.

Thus, by expanding the terms in this first order polynomial, the following equations hold.

$$\frac{P}{\rho n^3 D^5} = \frac{T}{a_1 \rho n^2 D^4} - \frac{a_0}{a_1}$$

$$P = \frac{TnD}{a_1} - \frac{a_0 \rho n^3 D^5}{a_1}$$

Minima of the above equation are given as follows:

$$\frac{dP}{dn} = 0 = \frac{TD}{a_1} - \frac{3 a_0 \rho n^2 D^5}{a_1}$$

Thus, a rotational speed n of the propeller 10 corresponding to the approximated optimum efficiency line 20 is given by:

$$n^2 = \frac{T}{3 a_0 \rho D^4} \qquad \text{Equation 1}$$

In this embodiment, the rotational speed n of the propeller 10 corresponding to the approximated optimum efficiency line 20 is determined using a measured value of the thrust produced by the propeller. However, in other embodiments, a value for the thrust produced by the propeller can, in effect, be estimated (or predicted). For example, a thrust from the propeller 10 can in effect be estimated by using a drag polar appropriate for the aircraft 2. Thus, the rotational speed n of the propeller 10 corresponding to the approximated optimum efficiency line 20 may be determined using a drag polar, e.g.

$$n^2 = \frac{F_D}{3a_0\rho\eta_i ND^4} \quad \text{Equation 2}$$

where:
- $F_D$ is the gross drag force on the aircraft 2, i.e. the total aerodynamic drag on the aircraft 2 (without thrust effects). This may be determined using a drag model for the aircraft 2 and measurements, estimations and/or prediction of the true airspeed of the aircraft V and the weight of the aircraft 2 (including any fuel and payload);
- $\eta_i$ is an installation efficiency factor; and
- N is the number of propellers operating on the aircraft 2.

Equation 1 and 2 advantageously tend to provide that a particularly efficient (e.g. optimum) propeller speed may be selected. This propeller speed may be selected using values for the thrust produced by the propeller 10, or the drag on the aircraft 2. Thrust is advantageously directly measurable in-flight. Also, drag may be advantageously predicted using a drag polar appropriate for the aircraft configuration (i.e. taking into account flaps, undercarriage stores etc.).

Thus, in this embodiment at step s8 the processor 6 determines a propeller speed n for the propeller 10 using Equation 1 or Equation 2 above. For example, a propeller speed n for the propeller 10 may be determined using Equation 1 and the values measured (at step s4 above) for the density of the air, and the thrust generated by the propeller 10.

Returning now to the process of FIG. 2, at step s10, the processor 6 sends a signal corresponding to the propeller speed determined at step s8 to the propeller governor 8.

At step s12, the propeller governor 8 adjusts the pitch of the blades of the propeller 10 such that the rotational speed of the propeller 10 is substantially equal to the propeller speed determined at step s8.

In this embodiment, in operation the process shown in FIG. 2 and described above is performed periodically, i.e. at regular intervals. In other embodiments, the process may be performed/repeated at irregular intervals. In other words, the plurality of sensors 4 takes measurements at regular intervals. Also, the variables in the equations used by the processor 6 (i.e. Equations 1 and/or 2) are updated at regular intervals. Thus, updated values for the propeller speed are generated periodically. These propeller speeds are imposed on the propeller 10 by the propeller governor 8 as they are generated. The repeated performance of the above described process tends to provide convergence to a particularly efficient (e.g. optimum) propeller speed.

Thus a process of operating the aircraft 2 in which a process of determining a propeller speed is implemented is provided.

An advantage provided by the above described process of operating the aircraft 2 is that a propeller speed is determined that, when imposed on the propeller, tends to provide that the propeller advantageously operates at relatively high (e.g. peak) propulsive efficiency whilst the aircraft cruises. This advantageously tends to reduce or minimise the shaft power of the engine needed to maintain aircraft cruising speed. In turn, this tends to reduce or minimise fuel usage by the aircraft during cruising. Furthermore, if a thrust sensor is used to measure the thrust produced by the propeller (as opposed to estimating thrust using a drag model as described above with respect to Equation 2), particularly efficient propeller speeds (e.g. an optimum propeller speed) tend to be continuously determined at all times, and under all conditions (including dynamic events, e.g. during climbs and accelerations), as a response to engine throttle position. This allows the propeller to provide relatively high (e.g. maximum possible) thrust. This in turn tends to reduce or minimise the elapsed time and/or fuel consumed during the manoeuvre.

In the above embodiments, the propeller speed n for the propeller 10 is determined using Equation 1 or 2, and the values of the parameters measured at step s4. However, in other embodiments the propeller speed n for the propeller 10 is determined using a different appropriate equation and/or measured values of different parameters.

What will now be described is a further embodiment in which the propeller speed n for the propeller 10 is determined in a different way to that described in the above embodiment.

Figure 4:
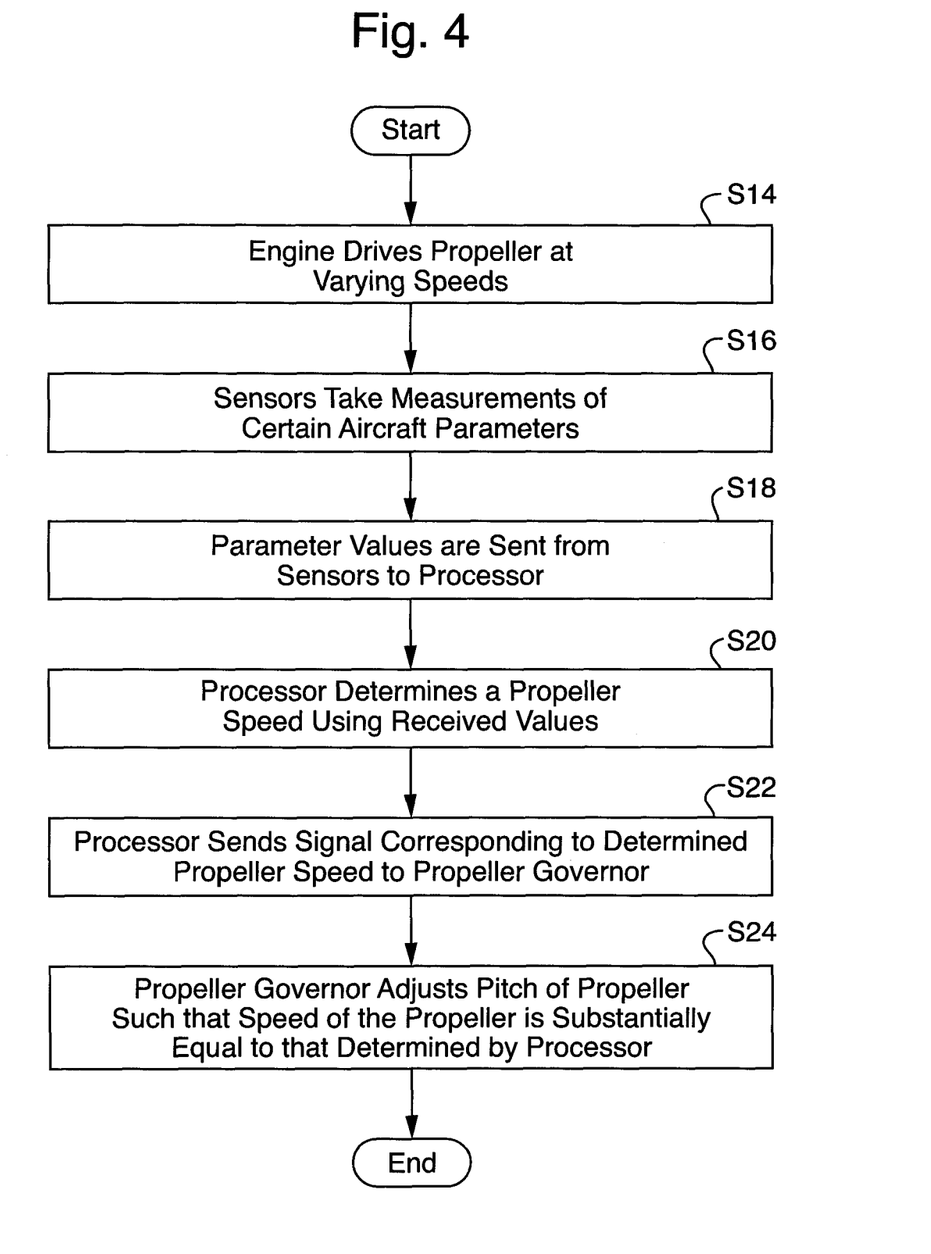
FIG. 4 is a process flowchart showing certain steps of a further process of operating the aircraft in which a further process of determining a propeller speed is implemented.

FIG. 4 is a process flowchart showing certain steps of a further embodiment of a process of operating the aircraft 2. This process comprises a further process of determining a propeller speed for the propeller 10.

At step s14, the engine 12 drives the propeller 10 (i.e. causes the propeller 10 to rotate). In this embodiment, the propeller 10 is not driven by the engine 12 with substantially constant speed. Instead, in this embodiment the propeller 10 is driven with changing (i.e. dynamic) speed by the engine 12. For example, in this embodiment, the aircraft 2 is not "cruising". Instead, in this embodiment, the aircraft 2 is performing different events e.g. climbs, accelerations, etc.

At step s16, the plurality of sensors 4 measure (or in some other way determine or calculate) values for each of the following parameters: the airspeed of the aircraft 2, the density of the air, and the torque applied to the propeller 10.

At step s18, the values of the parameters measured by the plurality of sensors 4 at step s16 are sent from the plurality of sensors 4 to the processor 6.

At step s20, using the received parameter values, the processor 6 determines a relatively efficient propeller speed for the propeller 10.

Figure 5:
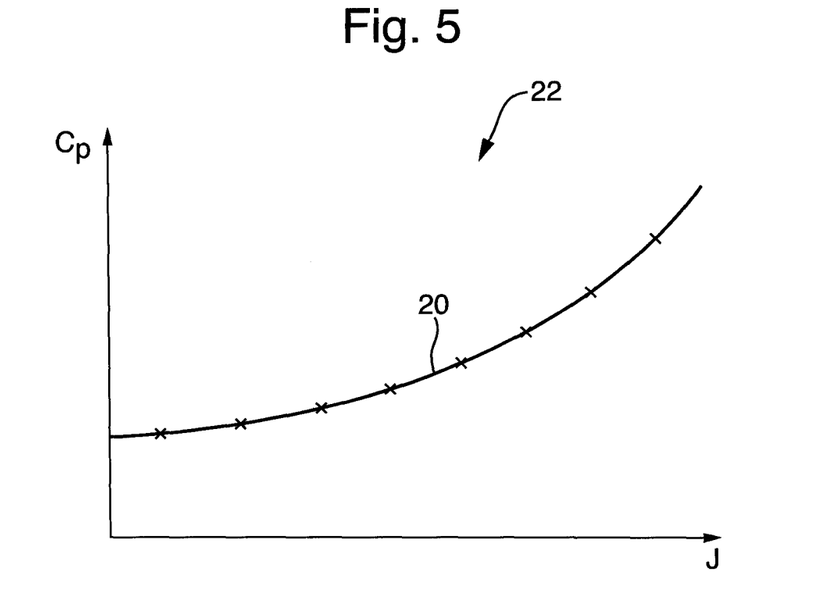
FIG. 5 is a schematic illustration (not to scale) of a further propeller map for the propeller 10 that relates the power coefficient $C_P$ and the advance ratio J of the propeller.

In this embodiment, the processor comprises (or has access to) a propeller map, hereinafter referred to as the "further propeller map", that relates the power coefficient $C_P$ and the advance ratio J of the propeller 10.

FIG. 5 is a schematic illustration (not to scale) of a further propeller map 22 for the propeller 10 that relates the power coefficient $C_P$ and the advance ratio J. In this embodiment, the further propeller map 22 is loaded into the processor 6.

The optimum efficiency line 20 of the propeller 10 is shown in FIG. 5.

In this embodiment, the optimum efficiency line 20 is non-linear. In this embodiment, the optimum efficiency line 20 is approximated using a second order polynomial, i.e.

$$C_P = b_2 J^2 + b_1 J + b_0$$

where $b_0$, $b_1$ and $b_2$ are constants. Values of these constants are computed from the further propeller map 22.

Thus, by expanding the terms in this second order polynomial, the following equation holds:

$$\frac{P}{\rho n^3 D^5} = b_2 \left(\frac{V}{nD}\right)^2 + b_1 \left(\frac{V}{nD}\right) + b_0$$

where:
P the is power supplied to the propeller 10 by the engine 12; and
V the is true airspeed of the aircraft 2.
In this embodiment, the following equation also holds:

$$P = Q \cdot \omega = Q \cdot 2\pi n$$

where $\omega$ is the angular velocity of the propeller 10.
Thus, $$\frac{2\pi n Q}{\rho n^3 D^5} = \left(\frac{b_2 V^2}{D^2}\right) n^{-2} + \left(\frac{b_1 V}{D}\right) n^{-1} + b_0$$

Thus, $$b_0 n^2 = \left(\frac{b_1 V}{D}\right) n + \left(\frac{b_2 V^2}{D^2} - \frac{2\pi Q}{\rho D^5}\right) = 0$$

Thus, the following equation holds (taking the positive root for the rotational speed n of the propeller 10):

$$n = \frac{-\left(\frac{b_1 V}{D}\right) + \sqrt{\left(\frac{b_1 V}{D}\right)^2 - 4b_0\left(\frac{b_2 V^2}{D^2} - \frac{2\pi Q}{\rho D^5}\right)}}{2b_0} \quad \text{Equation 3}$$

Equation 3 advantageously tends to provide that a particularly efficient (e.g. optimum) propeller speed may be selected. This propeller speed may be selected using values for the torque applied to the propeller 10. Torque is advantageously a robustly monitored parameter of the gearbox of the aircraft 2.

Thus, in this embodiment at step s20 the processor 6 determines a propeller speed n for the propeller 10 using Equation 3 above.

At step s22, the processor 6 sends a signal corresponding to the propeller speed n determined at step s20 to the propeller governor 8.

At step s24, the propeller governor 8 adjusts the pitch of the blades of the propeller 10 such that the rotational speed of the propeller 10 is substantially equal to the propeller speed n determined at step s20.

In this embodiment, in operation the process shown in FIG. 4 and described above is performed/repeated periodically, i.e. at regular intervals. In other embodiments, the process may be performed/repeated at irregular intervals. In other words, in this embodiment the plurality of sensors 4 takes measurements at regular intervals. Also, the variables in the equation used by the processor 6 (i.e. Equation 3) are updated at regular intervals. Thus, updated values for the propeller speed are generated periodically. These propeller speeds are imposed on the propeller 10 by the propeller governor 8 as they are generated. In this embodiment, changing the rotational speed of the propeller 10 tends to change the torque applied to the propeller 10. Thus, performing the process periodically advantageously tends to provide convergence to a particularly efficient (e.g. optimum) propeller speed.

Thus a further process of operating the aircraft 2 in which a process of determining a propeller speed is implemented is provided.

A parameter that tends not to "non-dimensionalise" on a propeller map is "tip Mach number". However, the optimum efficiency line in a propeller map tends to be substantially Mach-invariant at typical flight speeds. Thus, in other embodiments, an optimum efficiency line that is fit on average Mach values may be used to determine a propeller speed. In embodiments when tip Mach tends to be a significant parameter (e.g. when the aircraft flies at high subsonic speeds), efficient propeller speeds can be advantageously determined and corresponding tip Mach values can be deduced without the use of the above described equations (Equations 1-3). An error tends to exist between the deduced tip Mach and the tip Mach on which the propeller map is based. A new efficient propeller speed (i.e. that corresponds to an error of zero between the deduced tip Mach from a propeller map and the tip Mach on which that propeller map is based) may be interpolated from a number of different propeller maps (corresponding to different tip Mach values) and the corresponding propeller speeds.

An advantage provided by the above described processes is that integration of the propeller, powerplant/engine and airframe or the aircraft tends to be advantageously provided. A method of increasing propeller efficiency by varying propeller speed for an unmanned vehicle tends to be provided.

An advantage provided by the further embodiment is that particularly efficient propeller speeds (e.g. an optimum propeller speed) tend to be continuously determined at all times, and under all conditions (including dynamic events, e.g. during climbs and accelerations), as a response to engine throttle position. This tends to allow the propeller to provide relatively high (e.g. maximum possible) thrust. This in turn tends to reduce or minimise the elapsed time and/or fuel consumed during the manoeuvre.

An advantage provided by the above described processes for operating an aircraft is the aircraft propeller is operated at a relatively efficient speed whilst the aircraft cruises. This tends to provide that the propeller operates at relatively high (e.g. peak) propulsive efficiency. This tends to minimise engine shaft power and fuel usage. The further embodiment of the process for operating the aircraft further tends to provide that relatively efficient propeller speed are implemented whilst the aircraft performs manoeuvres such as climbs and accelerations. This tends to provide that relatively high thrust is provided during such manoeuvres. This also tends to provide that time taken to perform such manoeuvres, and/or the amount of fuel consumed during such manoeuvres, is advantageously reduced or minimised.

A further advantage provided by the above described processes for operating an aircraft is that non-dimensionalised propeller charts are exploited to provide relatively simple mathematical expressions that prescribing relatively efficient (or optimal) propeller speeds of a physical, dimensional system. The parameter values used in the mathematical expression tend to be available from a vehicle's air-data system and/or engine instrumentation.

The above described processes tend to be particularly advantageous when implemented for vehicles/systems with high fuel fractions and/or small payloads, e.g. long endurance unmanned air vehicles (UAVs). For example, the above described processes tend to be particularly advantageous when implemented for a UAV with a fuel fraction of approximately 50% and/or a payload fraction of approximately 15%. In vehicles/systems with high fuel fractions and/or small payloads, as efficiency is improved, the percentage of the aircraft weight that is made up of fuel may be replaced by payload. Thus, for a fixed vehicle weight, a greater payload may be transported. Alternatively, for a fixed payload mass, a lighter and/or smaller scale vehicle may be used to transport said payload.

The above described processes tend to be particularly advantageous when implemented for vehicles/systems with inhomogeneous requirements. For example, the above provided processes tend to be particularly beneficial when implemented on an aircraft that is permitted only a short distance in which to take-off. Such an aircraft may use a relatively large propeller for taking-off. This propeller may be larger than required when the aircraft cruises.

The above described processes tend to be particularly advantageous when implemented for vehicles/systems performing in situation that they were not designed for. For example, the above provided processes tend to be particularly beneficial when implemented on an aircraft that travels at speeds or height much greater or less than those that it was designed to travel at.

A further advantage provided by the above described process is that noise (of the propeller/engine), e.g. whilst the aircraft is cruising, tends to be minimised or reduced. This reduced noise tends to result from reduced engine power (via increased efficiency). Also, this reduced noise tends to result from the minimised or reduced propeller tip Mach number.

A further advantage provided by the above described process is that process of vehicle and/or propeller sizing tend to be facilitated. Furthermore, the above described processes tend to be easy to incorporate into vehicle and/or propeller design tools.

It should be noted that certain of the process steps depicted in the flowchart of FIGS. 2 and 4 and described above may be omitted or such process steps may be performed in differing order to that presented above and shown in the Figures. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the process of determining a relatively efficient propeller speed is implemented for an aircraft. The aircraft is an unmanned aircraft. However, in other embodiments a relatively efficient propeller speed is determined for a propeller implemented in a different system. Examples of other appropriate systems include different vehicle, for example a water-based vehicle. Vehicles may be manned or unmanned. Further examples of other appropriate systems include an impeller or turbine, e.g. the propeller may be implemented including air-conditioning, gas-turbine, turbo-charger, and/or supercharger systems and the like.

In the above embodiments, the plurality of sensors comprises one or more sensors for measuring the airspeed of the aircraft, the density of the air, the thrust generated by the propeller, and the torque applied to the propeller. However, in other embodiments the plurality of sensors comprises one or more sensors for measuring a subset of those listed parameters. For example, in other embodiments, the plurality of sensors comprises one or more sensors for measuring the density of the air, and the thrust generated by the propeller. Also, in other embodiments, the plurality of sensors comprises one or more sensors for measuring the airspeed of the aircraft and the torque applied to the propeller.

In other embodiments the plurality of sensors comprises one or more sensors for measuring different parameters to those listed. Such different parameters may be measured instead of or in addition to one or more of those measured in the above embodiments, such that the above described functionality is provided.

In the above embodiments, the propeller is a conventional variable pitch propeller. The pitch of the blades of the propeller is controlled by the propeller governor so as to control the rotational speed of the propeller. Also, the propeller has two aerofoil blades. However, in other embodiments the propeller is a different type of propeller. Also, in other embodiments the propeller has a different number of aerofoil blades. In other embodiments the propeller is a derivative of a variable pitch propeller (e.g. an open-rotor, or ducted-fan etc.).

In the above embodiments, an expression used for determining a relatively efficient speed for the propeller is deduced by approximating an optimum efficiency line using either a first order, i.e. linear, polynomial equation (that relates the thrust coefficient and the power coefficient of the propeller) or second order, i.e. quadratic, polynomial equation (that relates the power coefficient and the advance ratio of the propeller). Also, in the above embodiments the expression used to determine the relatively efficient propeller speed is either Equation 1, Equation 2, or Equation 3 (provided above). However, in other embodiments the expression/formula used to determine a relatively efficient propeller speed is derived in a different way. For example, by approximating an optimum efficiency line using a different appropriate function, e.g. a different order polynomial. Also, in other embodiments the propeller speed may be determined in a different way, for example using one or more different appropriate formulae, expressions, or equations that satisfy the approximation to the optimum efficiency line, or by solving the optimum efficiency line approximation using a numerical method.

In the above embodiments, the propeller governor adjusts the pitch of the blades of the propeller such that the rotational speed of the propeller is substantially equal to the determined relatively efficient propeller speed. However, in other embodiments the propeller governor adjusts the pitch of the blades of the propeller in a different way, depending on the determined relatively efficient propeller speed. For example, in other embodiments the rotational speed of the propeller is adjusted until it is within a pre-defined threshold range of the determined relatively efficient propeller speed. In other embodiments the rotational speed is altered, e.g. by the propeller governor, towards the determined relatively efficient propeller speed until a certain criteria is satisfied, e.g. until a torque error of the propeller is less than a predefined threshold.

In other embodiments, using the determined relatively efficient propeller speed, a control strategy for varying the propeller speed is determined (e.g. by the processor) and implemented (e.g. by the propeller governor). This may, for example, be performed using measurements of the vehicle dynamics. This advantageously tends to avoid unstable vehicle dynamics e.g. pilot induced oscillations.

In other embodiments, an above described process of determining a propeller speed and varying the propeller speed depending on that determined value may be implemented in a "stepped" form. In such a form, an above described process is implemented and the rotational speed of the propeller is varied (stepped) between discrete propeller speeds (e.g. as the determined relatively efficient propeller speed tends towards those discrete speeds). Such a method tends not to use any analysis of vehicle behaviour.

Furthermore, as opposed to determining a propeller speed using an above described equation, a propeller speed may be determined in a different way, for example, from a look-up table. Such a method tends to be advantageously simple. For example, a propeller speed may be found in a look-up table depending on measured values of air density, airspeed etc. A look-up table may take into account the configuration of a vehicle/aircraft (e.g. stores, sensors, flaps, undercarriage, vehicle drag etc.).

In the above embodiments, in operation the process shown in an above described flow chart (i.e. FIG. 2 or 4) is performed/repeated periodically, i.e. at regular (discrete) intervals. However, in other embodiments the method is performed in a different way. For example, in other embodiments, the process is performed continuously. Also in other embodiments, the process is not repeated.

The invention claimed is:

1. A method of operating a propeller, the propeller moving through a fluid, the method comprising:
   measuring a value of a property of the fluid;
   measuring a value of a parameter, the parameter being related to one or more forces applied to the propeller or derived at least in part from action of the propeller;
   using the measured value of the property of the fluid and the measured value of the parameter, determining a desired rotational speed for the propeller; and
   controlling the propeller such that the rotational speed of the propeller is equal to the determined rotational speed.

2. The method according to claim 1, wherein measuring the value of the parameter comprises:
   measuring a value for thrust produced at least in part by the action of the propeller.

3. The method according to claim 1, wherein measuring the value of the parameter comprises:
   measuring a value of a parameter related to drag produced at least in part by the action of the propeller.

4. The method according to claim 1, wherein measuring the value of the parameter comprises:
   measuring a value for a torque applied to the propeller; and
   measuring a value for a velocity produced at least in part by the action of the propeller.

5. The method according to claim 2, wherein determining a rotational speed for the propeller comprises calculating:

$$n^2 = \frac{T}{3a_0 \rho D^4}$$

where:
   n is the rotational speed for the propeller;
   T is the measured thrust produced by the action of the propeller;
   $\rho$ is a density of the fluid;
   D is a diameter of the propeller; and
   $a_0$ is a constant.

6. The method according to claim 3, wherein determining a rotational speed for the propeller comprises calculating:

$$n^2 = \frac{F_D}{3a_0 \rho \eta_i N D^4}$$

where:
   n is the rotational speed for the propeller;
   $F_D$ is a drag force;
   $\eta_i$ is an installation efficiency factor;
   N is a total number of propellers;
   $\rho$ is a density of the fluid;
   D is a diameter of the propeller; and
   $a_0$ is a constant.

7. The method according to claim 4, wherein determining a rotational speed of the propeller comprises calculating:

$$n = \frac{-\left(\frac{b_1 V}{D}\right) + \sqrt{\left(\frac{b_1 V}{D}\right)^2 - 4b_0\left(\frac{b_2 V^2}{D^2} - \frac{2\pi Q}{\rho D^5}\right)}}{2b_0}$$

where:
   n is the rotational speed for the propeller;
   V is the measured value for the velocity produced by the action of the propeller;
   Q is the measured value for the torque applied to the propeller;
   p is property density of the fluid;
   D is a diameter of the propeller;
   $b_o$ is a constant;
   $b_1$ is a constant; and
   $b_2$ is a constant.

8. The method according to claim 5, wherein a constant is determined by approximating an optimum propeller efficiency using a polynomial, the constant being a coefficient of a term of the polynomial.

9. The method according to claim 6, wherein a constant is determined by approximating an optimum propeller efficiency using a polynomial, the constant being a coefficient of a term of the polynomial.

10. The method according to claim 7, wherein a constant is determined by approximating an optimum propeller efficiency using a polynomial, the constant being a coefficient of a term of the polynomial.

11. The method according to claim 1, wherein the propeller is a propeller of an unmanned aircraft.

12. The method according to claim 1, wherein the propeller is driven by a gas turbine engine.

13. The method according to claim 12, wherein the propeller is a free turbine turboprop.

14. A non-transitory program or plurality of programs arranged such that when executed by a computer system or one or more processors it/they cause the computer system or the one or more processors to operate in accordance with the method of claim 1.

15. A non-transitory machine readable storage medium storing a program or at least one of the plurality of programs according to claim 14.

16. Apparatus for operating a propeller, the propeller moving through a fluid, the apparatus comprising:
   one or more sensors arranged to:
      measure a value of a property of the fluid; and
      measure a value of a parameter, the parameter being related to one or more forces applied to the propeller or derived at least in part from the action of the propeller;
   one or more processors configured to determine a rotational speed for the propeller using the measured value of the property of the fluid and the measured value of the parameter; and
   means for controlling the propeller such that the rotational speed of the propeller is equal to the determined rotational speed.

* * * * *